Sept. 12, 1967 S. T. WILLIAMS 3,340,894
PRESSURE REGULATOR
Filed May 7, 1965

3,340,894
PRESSURE REGULATOR
Selden T. Williams, Middlebury, Conn., assignor to Scovill Manufacturing Company, Waterbury, Conn., a corporation of Connecticut
Filed May 7, 1965, Ser. No. 454,043
1 Claim. (Cl. 137—505.25)

ABSTRACT OF THE DISCLOSURE

An improved pressure regulator of simple construction and reduced number of parts employs a pressure sensitive element made of foam material which is adhesively secured to a plate, which plate is clamped between the cap and valve body. The other side of the foam material is adhesively secured to a valve carrier which co-operates with a valve seat in the cap.

---

My invention relates to pressure regulators, or reducing valves, which can be installed in any fluid pressure line to maintain a maximum uniform pressure in the discharge line from a source of substantially higher pressure.

Many types of pressure regulators are now available, but if they are made to give a close degree of regulation, they are relatively complicated and expensive. They are also difficult or impossible to repair unless skilled in the service thereof.

An object of my invention is to provide a pressure regulator which will operate to control the output pressure within close limits; which is of simple construction and therefore economical to manufacture; and in which the principal working parts are easily removable and replaceable.

A further object is to devise a regulator that may be preset and once installed, difficult for unauthorized persons to disturb.

In the accompanying drawing, I have shown for purpose of illustration, one embodiment which the invention may assume in practice. In the drawing.

Figure 1:
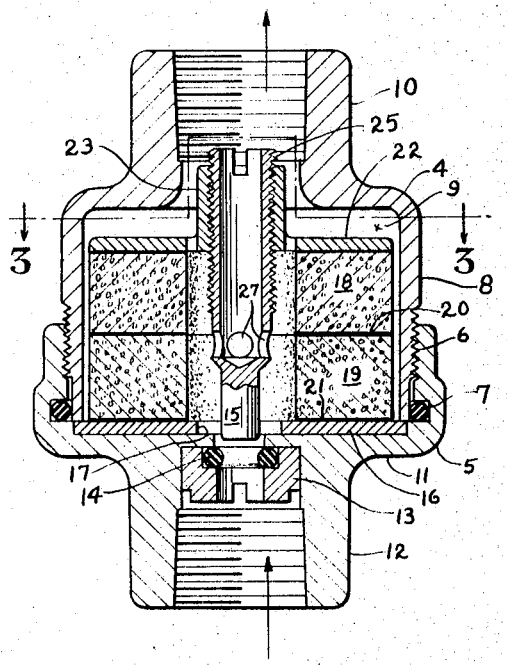
FIG. 1 is a central cross-section through my improved regulator with the valve in open position.

The regulator illustrated is enclosed in a housing of two sections 4 and 5, which are detachably connected together by threads 6, there being a gasket such as an O-ring 7 suitably arranged to prevent leakage.

The section 4 has a cylindrical body 8 providing a low pressure chamber 9, and at one end of the body 8 and preferably in axial alignment with it, is an outlet connection 10 which may be internally threaded to receive a delivery pipe. The other section 5 is in the form of a cap having an end wall 11 extending across the chamber 9, and an inlet connection 12 which may also be threaded to receive a supply pipe.

At the upper end of the inlet connection 12, there is secured a bushing 13 which houses the ported valve seat, herein in the form of an O-ring 14. The valve 15, together with its actuating device, is carried by a support plate 16 which is clamped between the body section 4 and cap section 5. This plate has a central hole 17 substantially larger than the valve 15 to allow free flow of fluid around the valve.

The pressure responsive element in the low pressure chamber 9 is made of two annular blocks or discs 18 and 19, glued together along the line 20. These blocks consist of a suitable foam material having a multiplicity of elastically-walled and hermetically sealed gas-containing cells. This unit consisting of the blocks 18 and 19 is secured as by adhesive along the bottom surface 21, directly to the stationary support plate 16.

Figure 3:
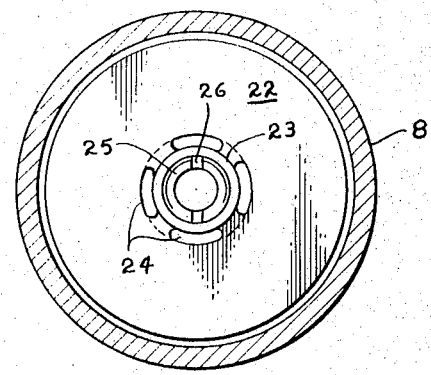
FIG. 3 is a cross-section on line 3—3 of FIG. 1.

The opposite side, or top surface, of the pressure responsive element has secured thereto as by adhesive, a valve carrier member in the form of a plate 22 with an internally threaded boss 23. The plate 22 has the apertures 24 as best seen in FIG. 3, to allow free passage of fluid flowing through the regulator, and the discs 18 and 19 have holes through their center to allow free flow from the ported valve seat to the outlet connection 10.

The valve 15 is carried by the hollow threaded valve stem 25 which can be adjusted to any desired position in the threaded boss 23 by engaging a screw driver in the slot 26. If desired, this stem may be hollow and have side ports 27 for conducting the pressure fluid either as an alternative or in addition to the apertures 24.

Figure 2:
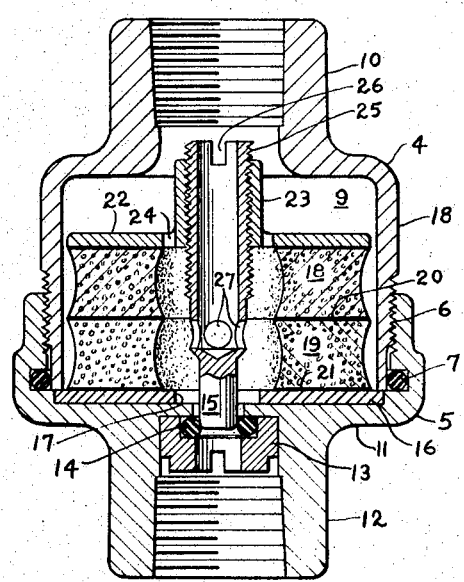
FIG. 2 is a similar view with the valve in closed position.

In the normal unpressurized condition, as seen in FIG. 1, the blocks of foam material 18 and 19 have a cylindrical inner and outer surface. When the valve is in use, however, the pressure in the chamber 9 will be that desired for the outlet 10 and when the blocks 18 and 19 are under pressure, they will shrink in thickness so that the plate 22 will force the valve 15 toward the seat 14. At the same time, the internal and external walls of the foam material blocks will curve inwardly as seen in FIG. 2, but this tendency is minimized by laminating the pressure responsive element. For purposes of a simple regulator, two such laminations are believed to be sufficient. Of course, only the extreme open and closed positions are shown in FIGS. 1 and 2 and in practice, the foam material is so sensitive that it will respond quickly to variations in the outlet pressure so as to maintain a fine degree of regulation. There are no springs or levers so that friction is virtually eliminated. Adjustment of the outlet pressure can be easily accomplished through the outlet connection which is in axial alignment with the valve stem. Presetting is thus possible through the use of a suitable "preset" apparatus. However, after the outlet pressure has once been set, and the regulator assembled, it is not likely to be tampered with by unauthorized persons because the adjusting means is entirely concealed.

The regulator is believed to be highly reliable and durable. One important advantage is that it can be quickly disassembled by removing the screw cap 5 whereupon all of the working parts of the regulator are removed as a unit so that repairs or replacements are a simple matter.

Such terms as "top" or "bottom" are used for the sake of convenience only, and it is obvious that the regulator will operate in any oriented position.

What I claim is:

A pressure regulator comprising a hollow cylindrical body providing a low pressure chamber, an outlet connection at one end of said body, a cap secured to the other end of said body, a valve seat housed in said cap and communicating with said chamber, an inlet connection on said cap leading to said valve seat, a support plate clamped between said body and cap, a pressure responsive element of foam material in said chamber having its bottom surface adhesively attached to said support plate, a valve carrier member adhesively attached to the top surface of said pressure responsive element, a valve stem adjustably mounted on said carrier member extending through said element and said plate, a valve on the end of said stem movable toward said valve seat upon increase of the pressure acting in said pressure responsive element, and passage means for conducting fluid from said valve seat through said low pressure chamber to said outlet connection when the valve is open.

References Cited

UNITED STATES PATENTS

| | | | |
|---|---|---|---|
| 892,450 | 7/1908 | Robinson | 137—505.25 |
| 1,818,061 | 8/1931 | Holley | 137—505.25 |
| 2,885,173 | 5/1959 | Dobrick | 137—510 X |
| 3,045,704 | 7/1962 | Williams | 137—505.41 X |
| 3,189,046 | 6/1965 | Callahan. | |

WILLIAM F. O'DEA, *Primary Examiner.*

H. W. WEAKLEY, *Assistant Examiner.*